Sept. 11, 1928. Re. 17,083

E. E. LUNDBERG

ADJUSTABLE STRIKER PLATE

Original Filed Jan. 5, 1925

Inventor

Everett E. Lundberg

By Whittemore Hulbert & Belknap

Attorneys

Reissued Sept. 11, 1928. Re. 17,083

UNITED STATES PATENT OFFICE.

EVERETT E. LUNDBERG, OF DETROIT, MICHIGAN, ASSIGNOR TO BRIGGS MANUFACTURING COMPANY, OF DETROIT, MICHIGAN, A CORPORATION OF MICHIGAN.

ADJUSTABLE STRIKER PLATE.

Original No. 1,630,533, dated May 31, 1927, Serial No. 677, filed January 5, 1925. Application for reissue filed February 13, 1928. Serial No. 254,069.

This invention relates generally to striker plates and refers more particularly to those designed for use in connection with the movable bolts of vehicle door locks and latches.

One of the essential objects of the invention is to provide a plurality of striker plates that are preferably arranged in tandem and are adapted to be alternately engaged by the bolt of the lock for holding the door in either a partially closed position or in a fully closed position with respect to a suitable door jamb.

Another object is to provide a striker plate of this type that may be readily adjusted without interfering with the usual trimming material of the vehicle body for taking up wear and preventing rattling.

A further object is to provide simple and effective means for adjusting the adjustable striker plate.

Still another object is to provide strong and durable striker plates that are simple in construction and can be manufactured at a comparatively low cost.

With the above and other objects in view the invention consists of certain novel features of construction, combinations and arrangements of parts as will more fully be described and particularly pointed out in the appended claims.

Figure 1:
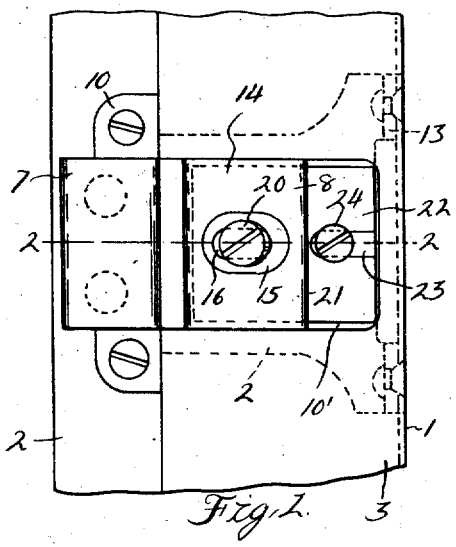
Figure 1 is a fragmentary side elevation of a door jamb with striker plates embodying my invention attached thereto.
Figure 3:
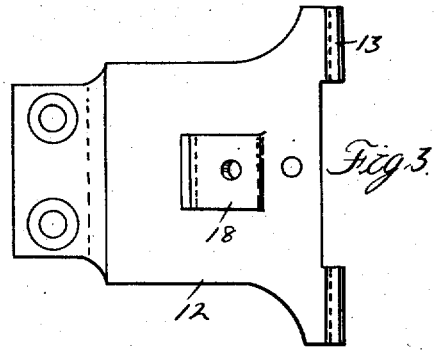
Figure 3 is a top plan view of the retainer plate.
Figure 4:
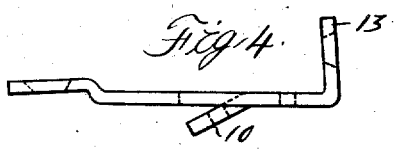
Figure 4 is a side elevation of the retainer plate shown in Figure 3.
Figure 2:
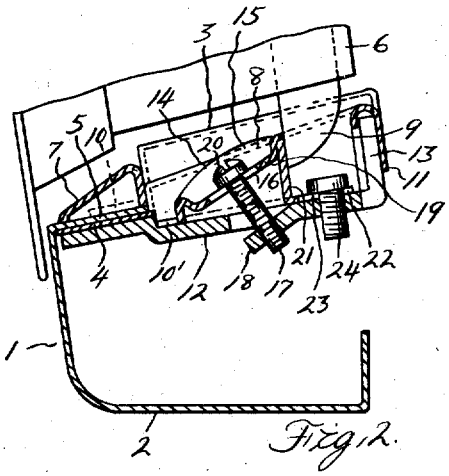
Figure 2 is a cross-sectional view taken on the line 2—2 of Figure 1.
Figure 5:
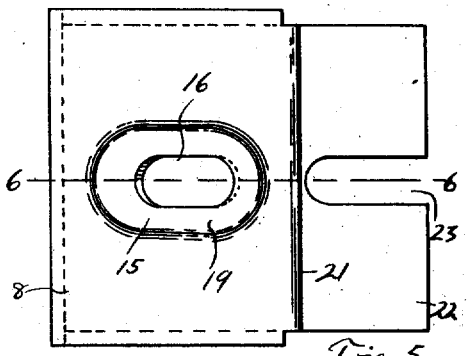
Figure 5 is a top plan view of the inner adjustable striker plate.
Figure 6:
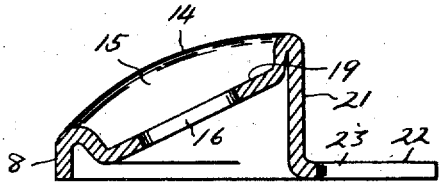
Figure 6 is a longitudinal sectional view taken on the line 6—6 of Figure 5.
Figure 7:
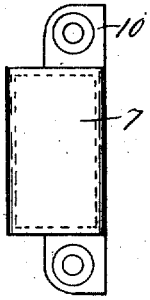
Figure 7 is a top plan view of the outer striker plate.

Referring now to the drawings, in which like reference characters designate corresponding parts throughout the several views, the numeral 1 designates a door jamb, preferably of a vehicle body. This jamb may be formed of any suitable material and may be any shape desired, however it is preferably formed of two sheet metal stampings 2 and 3 respectively. As shown, the stamping 3 is preferably channel shaped in cross-section and is provided at its forward edge with a laterally extending flange 4, while the stamping 2 is also preferably channel shaped in cross section and has one flange 5 thereof overlapping the lateral flange 4 of the stamping 3. These overlapping flanges may be secured together by any suitable means but are preferably welded together.

In order that a swinging door 6 may be held partially closed or fully closed with respect to the door jamb 1, I preferably provide two striker plates 7 and 8 respectively that are arranged in tandem upon the door jamb 1 and are adapted to be engaged by the movable bolt 9 of a lock (not shown) carried by the door 6.

The striker plate 7 is preferably formed of sheet metal and is preferably permanently secured to the jamb section 2 while the striker plate 8 is also preferably formed of sheet metal but is adjustable transversely of the section 3 for taking up wear and preventing the bolt 9 from rattling. As shown, the striker plate 7 is wedge-shaped in form and is provided at its opposite sides with the outwardly-extending attaching ears 10 which are preferably riveted to the flange 5 of the jamb section 2.

The striker plate 8 is also preferably wedge-shaped in form but is movable longitudinally of an elongated opening 10′ that extends transversely of the jamb section 3 from the inner edge of the lateral flange 4 to a point adjacent to the rear flange 11. For supporting the striker plate 8 in the opening 10′, I preferably provide a retainer plate 12 that bridges the opening 10′ and is permanently secured to section 3. As shown, this retainer plate 12 is preferably riveted at its forward end to the lateral flange 4 of the section 3 and is provided at its rear end with a lateral flange 13 that is secured to the rear flange 11 of the section 3.

In order that the inner striker plate 8 may be readily adjusted transversely of the jamb 1 without interfering with the usual trimming material, (not shown) of the vehicle body, the inclined wall 14 of the striker plate 8 is preferably provided with a longitudinally extending depressed portion 15 having an elongated slot 16 for receiving a suitable headed element such as a screw 17 that threadedly engages a tongue 18 struck out from the retainer plate 12. As shown, the base 19 of the depressed portion 15 is preferably disposed at an angle with respect to the retainer plate 12, but is preferably substantially parallel to the tongue 18. Thus, when the screw 17 is rotated inwardly, the head 20 thereof will bear against the inclined base 19 of the depression 15 and will adjust the striker plate 8 at the rear. However, the base 19 of the depression 15 is located a sufficient distance from the inclined face 14 of the striker plate 8 to prevent the head 20 of the screw 17 from interfering with the bolt 9 of the door lock.

To retain the striker plate 8 in adjusted position, the rear wall 21 thereof is preferably provided at its lower edge with a flat rearward extension 22 having a longitudinally extending slot 23 therein for receiving a suitable headed element such as a screw 24 that preferably threadedly engages the retainer plate 12 in the rear of the tongue 18. In use, when it is desired to adjust the striker plate 8 to the rear, the screw 24 is loosened, whereby the screw 17 may be adjusted inwardly of the tongue 18 to effect the desired adjustment of the striker plate 8. The screw 24 is then adjusted inwardly of the retainer plate 12 for holding the striker plate 8 in adjusted position. When it is desired to adjust the striker plate 8 forwardly both screws 17 and 22 are loosened and the striker plate 8 is then moved by hand to the desired adjusted position, whereupon both screws 24 and 17 are adjusted inwardly, preferably in the order named, to hold the striker plate 8 in position. Thus the striker plate 8 may be easily adjusted without affecting any of the other parts for taking up wear and preventing the bolt 9 from rattling.

While it is believed that from the foregoing description the nature and advantages of the invention will be readily apparent, I desire to have it understood that I do not limit myself to what is herein shown and described, and that such changes may be resorted to when desired as fall within the scope of what is claimed.

What I claim as my invention is:

1. The combination with a door jamb having an opening therein, of a retainer plate bridging the opening, a sheet metal wedge-shaped striker plate adjustably mounted on the retainer plate, means carried by the retainer plate for adjusting the striker plate, and means also carried by the retainer plate for holding said striker plate in adjusted position.

2. The combination with a door jamb having an opening therein, of a retainer plate bridging the opening having a struck-out tongue, a striker plate adjustably mounted on the retainer plate, and a headed element carried by the tongue for adjusting said striker plate.

3. The combination with a door jamb having an opening therein, of a retainer plate bridging the opening having a struck-out tongue, a striker plate slidably mounted on the retainer plate having a rearward extension, means carried by the tongue for sliding the striker plate, and means carried by the retainer plate engageable with the rearward extension for holding the striker plate in adjusted position.

4. The combination with a door jamb having an opening therein, of a retainer plate bridging the opening, a wedge-shaped striker plate adjustably mounted on the retainer plate having a rearward extension, means for adjusting the striker plate, and means carried by the retainer plate engageable with the rearward extension for holding the striker plate in adjusted position.

5. The combination with a door jamb, of a retainer plate carried thereby, a wedge-shaped striker plate adjustably mounted on the retainer plate having a rearward extension, a headed element carried by the retainer plate for adjusting the striker plate, and means also carried by the retainer plate engageable with the rearward extension for holding the striker plate in adjusted position.

6. The combination with a door jamb, of a retainer plate carried thereby, an adjustable wedge-shaped plate having a rearward extension slidably engaging the retainer plate, means for adjusting the striker plate, and means for clamping the rearward extension against the retainer plate for holding the striker plate in adjusted position.

7. The combination with a door jamb, of a plate carried thereby having a struck-out tongue, an adjustable headed element carried by the tongue, and a wedge-shaped striker plate having a depressed portion in the inclined wall thereof provided with an elongated opening receiving the headed element aforesaid.

8. The combination with a door jamb, of an adjustable wedge-shaped striker plate having a depressed portion in the inclined wall thereof provided with an elongated opening, a retainer plate for said striker plate having a struck out tongue disposed in a plane substantially parallel to the inclined wall of said striker plate, and means for adjusting said striker plate on said retainer plate including a headed element extending through the elongated opening aforesaid and engaging said tongue.

9. The combination with a door jamb having an opening therein, of a retainer plate bridging the opening, a plurality of wedge-shaped striker plates arranged in tandem on said retainer plate, means for adjusting one of said striker plates, and adjustable means for holding the adjustable plate in adjusted position.

10. The combination with a door jamb having an opening therein, of a retainer plate bridging the opening, a striker plate slidably mounted on said retainer plate and having an inclined portion disposed at an angle to the retainer plate, and means extending through said retainer plate and engageable with the inclined portion of said striker plate for adjusting said striker plate.

11. In combination, a retainer plate having a tongue extending at an angle therefrom, a striker plate adjustably mounted on said retainer plate, and means for adjusting said striker plate upon said retainer plate including a headed element carried by said tongue and engaging said striker plate.

12. In combination, a retainer plate having a tongue extending at an angle therefrom, a striker plate adjustably mounted on the retainer plate and having an inclined portion substantially parallel to said tongue, and means for adjusting said striker plate upon said retainer plate including a headed element having the head thereof disposed upon the inclined portion aforesaid of said striker plate and having the shank thereof engaging said tongue.

13. In combination, a retainer plate having a tongue extending at an angle therefrom, a striker plate adjustably mounted on said retainer plate, having an inclined portion substantially parallel to said tongue, and having an extension substantially parallel to said retainer plate, means for adjusting said striker plate upon said retainer plate including an element extending transversely of the inclined portion of said striker plate and said tongue, and means for retaining said striker plate in adjusted position including an element extending transversely of said extension and striker plate.

14. In combination, a retainer plate having portions attachable to a door jamb, and having a circular opening therein intermediate said attaching portions, a striker plate adjustably mounted upon said retainer plate and having an apertured portion substantially parallel to the apertured portion of said retainer plate, and means for retaining said striker plate in adjusted position upon said retainer plate including a headed element having the shank thereof extending through the apertured portion of said striker plate and through the circular opening in said retainer plate.

15. A striker plate formed entirely of sheet metal and comprising a hollow substantially wedge-shaped body having substantially parallel end walls, one of said walls being shorter than the other, and an inclined top wall extending between said end walls and provided with a substantially flat portion constituting a bearing for the head of a screw and provided in said flat portion with an elongated slot in which the shank of a screw may move longitudinally of said slot.

16. A striker plate formed entirely of sheet metal and comprising a substantially wedge-shaped body having substantially parallel end walls, one of said walls being shorter than the other, and an inclined top wall extending between said end walls and provided with a longitudinally extending depressed portion having a substantially flat bottom constituting a bearing for the head of a screw and provided with a longitudinally extending elongated slot in which the shank of a screw may move longitudinally of said bottom.

17. A striker plate formed entirely of sheet metal and comprising a substantially wedge-shaped body having substantially parallel end walls, one being shorter than the other, and an inclined top wall extending between said end walls and provided with a depressed portion having an inclined substantially flat bottom extending at substantially acute angles to said end walls and constituting an inclined bearing for the head of a screw, said inclined flat bottom being provided with a longitudinally extending elongated slot in which the shank of a screw may move longitudinally of said bottom.

18. In combination, a retainer plate provided intermediate of its ends with a threaded opening and provided at one end with a lateral flange, a latch bolt striker plate on the same side of said retainer plate as said lateral flange and movable toward and away from said flange, said striker plate having a rear wall extending at substantially right angles to said retainer plate and constituting an abutment for a latch bolt, said rear wall and lateral flange aforesaid being in substantially parallel planes, and means for securing said striker plate to and holding the same in adjusted position upon said retainer plate including an element extending through a portion of said striker plate and engaging the threaded opening in said retainer plate.

19. In combination, a retainer plate having attaching portions at its opposite ends and an intermediate substantially flat portion constituting a bearing for an adjustable striker plate, one of said attaching portions being in the form of a lateral flange, and said flat bearing portion having a threaded opening therein, a striker plate movable over said flat bearing portion toward and away from said lateral flange, and means for securing said striker plate to and holding the same in adjusted position upon said retainer plate including an element extending through a portion of said striker plate and engaging said threaded opening in the retainer plate.

In testimony whereof I affix my signature.

EVERETT E. LUNDBERG.